United States Patent Office

3,536,650
Patented Oct. 27, 1970

3,536,650
PREPARATION OF STABLE AQUEOUS EMULSIONS
Victor Jasinski, Dover, Del., and Marvin M. Fein, Westfield, N.J., assignors to GAF Corporation, New York, N.Y., a corporation of Delaware
No Drawing. Filed Mar. 18, 1968, Ser. No. 713,995
Int. Cl. C08f 45/24, 15/00
U.S. Cl. 260—29.6                    7 Claims

ABSTRACT OF THE DISCLOSURE

Stable aqueous emulsions containing graft terpolymers of a polymeric N-vinyl lactam, an acrylic ester monomer and an N-alkylol acrylamide, and process for production of the emulsions, comprising subjecting a mixture of the acrylic ester monomer and N-alkylol acrylamide in an aqueous solution of an activated polymeric N-vinyl lactam to polymerization conditions. The emulsion products are useful as adhesives and as additives to improve the the "hand" and abrasion resistance of resin-treated textiles.

BACKGROUND OF THE INVENTION

Field of the invention

This invention relates to stable, synthetic, aqueous emulsion products and more particularly to stable, aqueous emulsions containing a polymeric N-vinyl lactam, an acrylic ester monomer, and a functionally reactive monomer, such as an N-methylol acrylamide, and to processes for producing such emulsions.

DESCRIPTION OF THE PRIOR ART

It is well known in the art that N-vinyl lactams can be interpolymerized with other polymerizable monomers such as acrylic and methacrylic acids and their esters, amides, vinyl esters and the like. Such interpolymerization has been carried out in non-aqueous systems which are not well adapted for the production of aqueous emulsions. When such interpolymerizations have been carried out in aqueous systems, either water-soluble copolymers, interpolymers or mixtures of polymers have been obtained yielding aqueous solutions, or unstable emulsions have been obtained which separate upon standing and/or yield cloudy films. These cloudy films are normally considered to indicate incompatibility or instability and show that a true interpolymer has not been produced but is more likely merely a mixture of homopolymers. Nor has the concurrent use of a variety of catalysts, emulsifying agents, protective colloids, buffering agents, etc., resolved the problem.

A major use for acrylic and other polymers is in the form of aqueous emulsions as employed in the paint, coating, adhesive, polish, and textile fields. Aqueous emulsions have a great many advantages over other systems, such as organic solvent systems, including the absence of fire hazards, odor, low toxicity, low cost and the like. Ordinarily, emulsion polymerization is the preferred method for the preparation of such aqueous emulsions because of economy and safety of water as the polymerization medium, the ease of temperature control, the speed of reaction and the fact that the desired product in emulsion form is directly produced.

SUMMARY OF THE INVENTION

It is accordingly one object of this invention to provide stable aqueous emulsions containing a graft terpolymer of a polymeric N-vinyl lactam.

Another object of the invention is to provide stable aqueous emulsions containing a graft terpolymer of a polymeric N-vinyl lactam, an acrylic ester monomer and N-alkylol acrylamide or equivalent.

Still another object of this invention is the provision of a novel process for the production of graft terpolymers containing a polymeric N-vinyl lactam.

Other objects and advantages will appear as the description proceeds.

In satisfaction of the foregoing objects and advantages, there is provided by this invention a process for producing stable aqueous emulsions containing a terpolymer which comprises subjecting a mixture of an acrylic ester monomer and an N-alkylol acrylamide or functional equivalent in an aqueous solution of an activated polymeric N-vinyl lactam, to polymerization conditions in the presence of a free radical-supplying polymerization catalyst.

The process of this invention enables the provision of aqueous emulsions having surprisingly improved properties with respect to stability, low viscosity, film clarity, and the like. Extraction, solubility and film clarity tests indicate that in these emulsions, the polymeric product is in a high degree of interpolymerization or copolymerization and contains a minimum amount of homopolymer. The resulting emulsions can be compounded with a wide variety of additives such as pigments, salts, protective colloids, wetting agents, plasticizers, resins, waxes and the like to obtain a wide range of products for use in all fields in which polymers emulsion are now used, as in the paint, coating, adhesive, polish and textile fields. The terpolymers resulting from the process of the invention are particularly valuable as additives or co-reactants in the production of so-called "durable press" fabrics and garments produced in the textile industry by the application of thermosetting resins to the fabrics and garments with subsequent curing. The instant emulsions have been found to improve the "hand" and abrasion resistance of such fabrics and garments and thus are useful in overcoming one of the primary problems of the textile industry in this area.

DESCRIPTION OF THE PREFERRED EMBODIMENTS

According to the present invention it has been found that truly homogeneous, stable, aqueous emulsions of interpolymers of an N-vinyl lactam, an acrylic ester and N-alkylol acrylamide or functionally equivalent reactant, may be produced if by the polymerization techniques described herein, the polymeric N-vinyl lactam is pre-activated prior to reaction with the acrylic ester and N-alkylol acrylamide to form the graft terpolymer. It has been found that this pre-activation step is necessary in order to obtain a homogeneous graft terpolymer emulsion which will subsequently form a clear film and thus be useful in the areas mentioned above.

The emulsions produced in accordance with this invention are characterized by unusually good stability, low to medium viscosities, generally below about 2500 cps. (centipoises, Brookfield viscometer), the ability to deposit a clear transparent film on a glass plate, and a terpolymer product which is essentially water insoluble and at least about 90% soluble in benzene. They are further characterized by an ability to be converted to a thermoset product by heating with an acid or acid salt such as zinc nitrate, ammonium chloride, hydrochloric acid, oxalic acid, paratoluene, sulfonic acid, etc., at about 100° to 180° C. for one hour to one minute respectively. The product may be characterized as a graft terpolymer on a polymeric N-vinyl lactam substrate. By contrast, mere copolymerization of an N-vinyl lactam monomer, an acrylic ester monomer and N-methylol acrylamide without pre-activation, yields an unstable emulsion which has a relatively high viscosity of up to 75,000 cps. or more, which yields an opaque film on a glass plate and wherein the polymeric product is 50% soluble in benzene, apparently indicating the production of a water soluble N-vinyl lactam homopolymer and a benzene soluble acrylic ester homopolymer. Hence the present product differs from products of this type.

The process of the invention is carried out by initially pre-activating the polymeric N-vinyl lactam to be employed in forming the terpolymer emulsions. This pre-activation step may be effected in one embodiment by heating an aqueous solution of the polymeric N-vinyl lactam in the presence of a free-radical polymerization catalyst over a temperature range of about 60° to 180° C. However a preferred temperature for the heating step is from about 70° to about 100° C. An effective time period for the pre-activating heating step is about fifteen minutes to two hours. Obviously, equivalent procedures for activating the polymeric N-vinyl lactam may also be employed.

Since the subsequent graft polymerization with the acrylic ester monomer and N-methylol acrylamide is carried out in an aqueous emulsion system, it has been found advantageous to add emulsifiers and other additives to the aqueous polymeric N-vinyl lactam at the same time that the polymerization catalyst is added thereto in the pre-activation step. However, in a separate embodiment the pre-activation may be carried out by merely heating an aqueous solution of the polymeric N-vinyl lactam with the catalyst and then adding the emulsifiers or other additives ordinarily used in emulsion polymerization reactions at the conclusion of the activation step but prior to the addition of the acrylic ester monomer and N-methylol acrylamide.

After the pre-activation step is complete and the emulsifiers and other additives have been added thereto, the acrylic ester monomer and N-alkylol acrylamide reactants are added and polymerization carried out to graft the acrylic ester monomer and N-alkylol acrylamide onto the polymeric N-vinyl lactam backbone.

While the monomers may be added in any desired manner an advantageous procedure for better temperature control and production of a product with optimum properties, is to add the monomers gradually and/or in increments to the aqueous solution containing the polymeric N-vinyl lactam and polymerization catalyst. The reaction is exothermic in nature and is conveniently carried out at reflux or the boiling point of the mixture. However, the polymerization reaction may be carried out at any temperature ranging from room temperature up to the boiling point, depending upon the particular catalyst employed and the particular monomers and polymeric N-vinyl lactam. It is preferred to carry out this reaction at a temperature ranging from about 70° C. up to the boiling point of the mixture to accelerate completion thereof however. The pH of the medium is substantially noncritical, though a pH of about 2 to 7 or 8 is preferred. Completion of the reaction is determined by cessation of evolution of heat and/or spot analysis for solids content or residual monomer.

The polymerization reaction is substantially quantitative in that an emulsion is produced containing the polymeric N-vinyl lactam-acrylic ester N-alkylol acrylamide graft terpolymer in the dispersed phase with little or no polymeric product dissolved in the continuous aqueous phase.

The weight ratio of polymeric N-vinyl lactam to acrylic ester monomer to be employed in forming the products ranges from about 5:95 to 60:40. Particularly preferred products however are those which contain at least 50 percent acrelic ester monomer and more preferably those wherein the acrylic ester represents from about 67 to 90 percent of the terpolymer mixture. The amount of N-alkoyl acrylamide to be used may range from about 0.5 to 10 percent by weight of the lactam and acrylic ester total and more preferably from about 1.5 to 3 percent, preferably 2 percent, of the N-alkylol acrylamide. The catalyst may be employed in amounts ranging from about 0.05 to 2 or 3 percent by weight based on the weight of the acrylic ester monomer or mixture of monomers employed in the reaction. Desirably, the polymerization reaction should be carried out in a manner effective for yielding an aqueous emulsion containing about 10 to 60% of the graft copolymer product.

N-vinyl lactams and water soluble polymers thereof, and methods for their production are well known in the art. Thus, for example U.S. Pat. No. 2,317,804 discloses a suitable method for preparing N-vinyl lactams and U.S. Pat. Nos. 2,265,450 and 2,335,454 disclose methods for preparing water soluble polymers thereof and aqueous solutions containing the same.

As examples of N-vinyl lactams which may be employed in producing in known matter the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (1 to 10 carbon atoms) substituted derivatives of such N-vinyl lactams. Among this group polymeric N-vinyl-2-pyrrolidone (otherwise referred to as 1-vinyl-2-pyrrolidone, N-vinyl-pyrrolidone) is preferred. As illustrative of other vinyl lactams within this group which may be used, there may be mentioned N-vinyl-2-piperidone, N-vinyl-6-caprolactam, N-vinyl-5-methyl-2-pyrrolidone, N-vinyl-3,3-dimethyl-2-pyrrolidone and the like. Other N-vinyl lactams which may be employed include N-vinyl hexahydrophthalimidine, N-vinyl-naphthostyrile, etc. Depending upon the extent of polymerization, the water soluble polymeric derivatives of these N-vinyl lactams may have molecular weights ranging from at least 400 up to 2,000,000 or more. The Fickentscher K value is a convenient designation of relative degree of polymerization or relative molecular weight. Generally, there may be employed in this invention those polymeric N-vinyl lactams having a K value of about 10 to 200 and preferably about 20 to 60, and mixtures thereof.

The acrylic ester monomer (or mixtures thereof) employed herein may be any ester of acrylic, methacrylic, α-ethacrylic or α-chloracrylic acid with a monohydroxylic organic compound referred to herein as a monohydric alcohol, which may be saturated or unsaturated, aromatic or aliphatic, straight or branched chain, substituted or unsubstituted. As examples of suitable monohydroxylic organic compounds which may be employed for esterifying one of the above mentioned acrylic acids, there may be mentioned such alcohols as methyl, ethyl, propyl, butyl, isobutyl, 2-ethyl hexyl, amyl, hexyl, cyclohexyl, heptyl, dodecyl, octyl, oxo tridecyl, tetradecyl, pentadecyl, hexadecyl, octadecyl oleyl, arachidyl, cetyl, dimethylaminoethyl, tertiary-butylaminoethyl and benzyl alcohol in addition to cyclic compounds such as phenol, naphthol and the like. These esters are substantially water insoluble.

The N-alkylol acrylamide to be employed includes the N-alkylol derivatives of acrylamide and methacrylamide wherein the alkylol group contains from one to about seven carbon atoms. A preferred monomer of this type is N-methylol acrylamide.

The free radical-supplying polymerization catalysts useful in the present process are well known in the art. Many of the catalysts are compounds yielding oxygen under the conditions of polymerization, as represented by the inorganic and organic peroxygen or peroxide compounds. As examples of such compounds, there may be mentioned hydrogen peroxide, metal and alkali metal peroxides such as sodium, potassium, barium, and zinc peroxide, diacyl peroxides such as diacetyl, dibenzoyl and dilauroyl peroxide, dialkylperoxides such as di-(tertiary-butyl) peroxide and di-(tertiary-butyl) hydroperoxide, cyclohexane peroxide, inorganic peroxygen acids such as perboric, persulfuric and peracetic acid and their ammonium, sodium and potassium salts. In addition, reox systems such as potassium or ammonium persulfate-sodium bisulfite may be used. Other oxygen-yielding compounds or sources include atmospheric oxygen and ozone. Equivalent reacting catalysts may also be employed.

Azo type catalysts, i.e. compounds containing the azo linkage, may also be employed in the process of this invention. As examples of such catalysts there may be mentioned alpha, alpha-azo-diisobutyramide, dimethyl and diethyl alpha, alpha-azodiisobutyrate, and the like.

The preferred catalysts effective for the production of optimum results with respect to a minimum of homopolymer and maximum emulsion stability and film clarity are those which are water soluble, preferably the inorganic peroxygen compounds referred to above.

It will be understood that in carrying out the process of this invention, surface active agents, protective colloids, plasticizers, thickeners, and other additives may be added prior to, during, or after the polymerization reaction is completed. Anionic, nonionic or cationic emulsifying agents may be employed although anionic and nonionic agents are preferred. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acid amides, primary and secondary amines, hydroxyalkylamines, as disclosed for example in U.S. Pat. Nos. 1,970,578; 2,205,021; 2,085,706; 2,002,613; 2,226,141; 2,677,700; 2,213,477; 2,593,112; 2,454,434; 2,454,542–545, and 2,174,761. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O. 1 mole of soybean oil amine with 10 E.O., 1 mole of rosin amine with 32 E.O., 1 mole of coconut fatty acid amine with 7 E.O., 1 mole of dinonyl phenol with 15 E.O., 1 mole of oxo tridecyl alcohol with 12 E.O., Pluronic L62 and the like.

Suitable anionic surface active agents include the sulfonic acids, sulfate esters, and phosphate esters (particularly the primary and secondary phosphate esters and mixtures thereof) of the above mentioned nonionic surface active agents. Other anionic surface active agents include alkylaryl sulfonates, such as sodium dodecylbenzene sulfonate, alkyl sulfates such as sodium lauryl sulfate, taurides such as sodium N-methyl tauride, isethionates such as sodium N-methyl isethionate and the like.

Protective colloids and/or thickening agents may also be employed if desired, such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 20,000 cps. or more may thereby be obtained when required.

The following examples are illustrative of this invention and are not to be regarded as imitative. All parts and proportions referred to herein are by weight unless otherwise indicated.

EXAMPLE I (For comparison)

To a 4-neck, 1-liker flask fitted with stirrer, thermometer, nitrogen purging system and condenser was charged the following materials.

350 grams distilled water
120 grams N-vinyl-2-pyrrolidone
10 grams Triton X–200 (sodium isooctyl phenoxyethoxyethylsulfonate)
1 ml. NH₄OH (28%)
12 g. N-methylol acrylamide (60% solution)

Agitation was initiated, nitrogen purge was started and the mixture was heated to 60° C. There was then added:

1 ml. hydrogen peroxide (35%) and
90 grams butyl acrylate (added continuously over a 30 minute period).

The mixture was maintained for two hours at 90–100° C. During this time the product became very thick and coagulated upon cooling.

EXAMPLE II (For comparison)

To a 1-liter kettle equipped as in Example 1 was added the following materials:

40 grams polyvinyl pyrrolidone (PVP K–30 prepared by polymerization with hydrogen peroxide and NH₄OH as catalyst in aqueous solution and then spray dried).

|  | Grams |
|---|---|
| Distilled water | 220 |
| Butyl acrylate | 160 |
| N-methylol acrylamide (60% active) | 4 |

60 grams of the phosphate ester of nonyl phenol disclosed in Example 14 of U.S. Pat. No. 3,004,056.

|  | Grams |
|---|---|
| Ammonium persulfate | 0.05 |
| Sodium acetate | 0.3 |
| Aerosol OT (dialkyl sodium sulfosuccinate) | 1.0 |

The mixture was agitated, purged with nitrogen and heated to 70° C. over a 30 minute period. At this time a mildly exothermic reaction ensued and cooling was necessary. The 70° temperature was maintained for three hours after which time the temperature was raised to 80° C. and a solution of 0.3 gram ammonium persulfate in 10 grams distilled water was added to complete the polymerization. One-half hour later, the emulsion coagulated.

As will be appreciated from the above examples, if the three monomers, monomeric N-vinylpyrrolidone butylacrylate and N-methylol acrylamide, are merely polymerized as in Example I, the resulting terpolymer is not homogeneous product but apparently contains substantial amounts of a homopolymer of N-vinylpyrrolidone which is water-soluble and a homopolymer of the butyl acrylate which is benzene-soluble. In addition as shown in Example II, a homogeneous terpolymer is not obtained if an effort is made to graft the butyl acrylate and N-methylol acrylamide onto a homopolymer of N-vinylpyrrolidone, thus emphasizing the advantages of the novel procedure of the invention as exmplified in the following examples:

EXAMPLE III

To the same equipment as used in Example I was added:

|  | Grams |
|---|---|
| Distilled water | 200 |
| Polyvinyl pyrrolidone (PVP K–30) | 40 |
| Santomerse #3 [1] | 6 |
| Igepal CO 630 [2] | 8 |
| Ammonium persulfate | 1 |
| Sodium acetate, anhydrous | 1 |

[1] Dodecyl benzene sodium sulfonate.
[2] Nonionic surface active agent of nonyl phenol condensed with 10 moles of ethylene oxide.

The reaction mixture was agitated and purged with nitrogen while heating to 5° C. Temperature was maintained for one hour and the flask contents cooled to 70° C. Thereafter, twin addition funnels were set up to add through the condenser:

Funnel 1: 160 grams butyl acrylate

Funnel 2: 4 grams N-methylol acrylamide (60% active) in 60 grams water.

While the contents of the flask were at 70° C. the monomers in funnels 1 and 2 were added over a two hour period, while maintaining a 70° C. temperature. Upon completion of the addition, the reaction conditions were maintained for one additional hour and then a mixture of 0.1 gram ammonium persulfates in 20 grams of distilled water was added and the temperature maintained at 70°–75° C. for one hour. At that time the residual butyl-acrylate (determined by titration) was 0.75%. Another increment of persulfate (0.1 gram in 20 grams distilled water) was added, and the temperature of 70°–75° C. maintained for one hour. At this point the residual butyl acrylate was 0.17%.

On cooling, the product was found to be an off-white emulsion with a red-blue cast. The emulsion contained 41.3% solid, pH=3.95, viscosity=900 cps. The product withstood the high speed shear of a Waring Blendor for five minutes without coagulation.

EXAMPLE IV

To the same equipment as used in Example I was added:

| | Grams |
|---|---|
| Distilled water | 200 |
| Polyvinyl pyrrolidone (PVP K–30) | 40 |
| Ammonium persulfate | 1 |

The reaction mixture was agitated and purged with nitrogen while heating to 95° C. The temperature was maintained for one hour and cooled to 75° C.

At this point the following materials were added to the flask all at once:

| | Grams |
|---|---|
| Santomerse #3 | 6 |
| Igepal CO 630 | 8 |
| Sodium acetate anhydrous | 1 |

After this addition, twin additional funnels were set up to add the following materials:

Funnel 1: 175 grams ethylacrylate
Funnel 2: 3 grams N-methylol acrylamide (60% active) in 55 grams of water.

The monomers were added over a two hour period while maintaining the temperature at about 75° C. After the addition was completed, agitation at 70° C. was continued for one additional hours. Thereafter a mixture of 0.1 gram ammonium persulfate in 20 grams of distilled water was added and the temperature maintained at 70°–75° C. for one hour. At that time the residual ethyl acrylate (determined by titration) was 0.8% and another increment of persulfate was added (0.1 gram in 20 grams distilled water). After stirring at 70°–75° C. for one additional hour, the residual ethyl acrylate was 0.19%.

On cooling the product was found to be an off-white emulsion with a red-blue cast. The product withstood the high speed shear of a Waring Blendor for five minutes without coagulation.

EXAMPLE V

The procedure of Example III was repeated except that the N-vinyl lactam employed was N-vinyl-2-piperidone. The emulsion resulting from the process was homogeneous and did not coagulate when subjected to the high speed shear of a Waring Blendor for five minutes.

EXAMPLE VI

The procedure of Example III was repeated except that the polymerization catalyst employed was dibenzoyl peroxide. The resulting homogeneous product exhibited the same properties.

EXAMPLE VII

The procedure of Example III was repeated except that the N-vinyl lactam was polymeric N-vinyl-6-caprolactam (30 grams) the acrylic ester monomer was isobutyl methacrylate (180 grams) and the temperature was maintained at 85° C.

The aqueous product resulting from this procedure was a stable, homogeneous emulsion having a light reddish-blue cast.

Various changes and modifications of the invention can be made, and to the extent that such variations incorporate the spirit of this invention, they are intended to be included within the scope of the appended claims.

What is claimed is:

1. A stable, homogeneous, aqueous emulsion containing a graft terpolymer comprising (a) a water soluble polymer of an N-vinyl substituted gamma, delta or epsilon-lactam and lower alkyl substituted derivatives thereof containing 4–7 carbon atoms in the lactam ring, (b) an acrylic ester monomer of a monohydric alcohol and a member selected from the group consisting of acrylic acid, methacrylic acid, alpha-ethacrylic acid and alpha-chloroacrylic acid, and (c) an N-alkylol acrylamide containing from 1–7 carbon atoms in the alkylol group, the acrylamide radical being selected from the group consisting of acrylamide and methacrylamide, wherein the polymeric N-vinyl lactam serves as the backbone of the graft terpolymer and the acrylic ester monomer and N-alkylol acrylamide monomer are grafted thereon, the polymeric N-vinyl lactam being preactivated prior to graft polymerization with the monomers.

2. An emulsion according to claim 1 wherein the weight ratio of the polymeric N-vinyl lactam to acrylic ester monomer ranges from 5:95 to 60:40 and the amount of the N-alkylol acrylamide ranges from 0.5 to 10 percent by weight of the polymeric N-vinyl lactam and acrylic ester monomer.

3. A stable aqueous emulsion according to claim 2 wherein the terpolymer contains at least 50% of the acrylic ester monomer.

4. A stable aqueous emulsion according to claim 3 wherein the terpolymer contains about 1.5–3% of the N-alkylol acrylamide based on the total weight of the polymeric N-vinyl lactam and acrylic ester.

5. An emulsion according to claim 1 wherein the polymeric N-vinyl lactam is preactivated prior to grafting of the monomers by heating an aqueous solution of the polymeric N-vinyl lactam in the presence of a free-radical polymerization catalyst at a temperature of about 60–180° C.

6. An emulsion according to claim 5 wherein the polymeric N-vinyl lactam is polyvinyl pyrrolidone, the acrylic ester is butyl acrylate and the N-alkylol acrylamide is N-methylol acrylamide.

7. A stable aqueous emulsion according to claim 1 wherein the emulsion contains about 10–60% of the graft terpolymer product.

References Cited

UNITED STATES PATENTS

| 2,680,110 | 6/1954 | Loughran et al. | |
| 2,890,199 | 6/1959 | McNalty et al. | |
| 2,922,768 | 1/1960 | Mino et al. | |
| 3,097,185 | 7/1963 | Armen et al. | |
| 3,222,423 | 12/1965 | Roebuck | 260—877 |
| 3,244,658 | 4/1966 | Grosser et al. | |
| 3,402,987 | 9/1968 | Dalton et al. | |

FOREIGN PATENTS

| 963,771 | 7/1964 | Great Britain. |

MURRAY TILLMAN, Primary Examiner

H. ROBERTS, Assistant Examiner

U.S. Cl. X.R.

117—139.4, 139.5, 161; 260—877, 885

PO-1050
(5/69)

UNITED STATES PATENT OFFICE
CERTIFICATE OF CORRECTION

Patent No. 3,536,650            Dated    October 27, 1970

Inventor(s)   VICTOR JASINSKI and MARVIN M. FEIN

It is certified that error appears in the above-identified patent and that said Letters Patent are hereby corrected as shown below:

Column 5, line 4, "reox" should read -- redox --. Column 6, line 70, "5°" should read -- 95° --.

SIGNED AND
SEALED

FEB 23 1971

(SEAL)
Attest:

Edward M. Fletcher, Jr.
Attesting Officer

WILLIAM E. SCHUYLER, JR
Commissioner of Patents